United States Patent

[11] 3,566,015

[72] Inventor Toshiro Watanabe Zushi-shi, Japan
[21] Appl. No. 732,763
[22] Filed May 28, 1968
[45] Patented Feb. 23, 1971
[73] Assignee Sony Corporation Tokyo, Japan
[32] Priority May 29, 1967
[33] Japan
[31] 42/34023

[54] COLOR TELEVISION CAMERA SYSTEM WITH MEANS FOR GENERATING AN INDEXING SIGNAL HIGHER IN FREQUENCY THAN THE VIDEO INFORMATION
10 Claims, 10 Drawing Figs.

[52] U.S. Cl. 178/5.4
[51] Int. Cl. H04n 5/42
[50] Field of Search 178/5.45 (TC), 5.4 (F)

[56] References Cited

UNITED STATES PATENTS

| | | | |
|---|---|---|---|
| 2,787,655 | 4/1957 | Stahl et al. | 178/5.45TC |
| 2,917,574 | 12/1959 | Toulon | 178/5.45TC |
| 3,001,012 | 8/1961 | Braicks | 178/5.45TC |
| 3,002,051 | 8/1961 | Tait | 178/5.45TC |
| 3,213,190 | 9/1965 | Mutschler | 178/5.4F |
| 3,407,265 | 10/1968 | Krause | 178/5.4 |

*Primary Examiner*—Robert L. Griffin
*Assistant Examiner*—Donald E. Stout
*Attorneys*—Albert C. Johnston, Robert E. Isner, Lewis H. Eslinger and Alvin Sinderbrand

ABSTRACT: A color video signal generating apparatus is provided and includes image pickup means having scanning means and being operative to photoelectrically convert light projected onto said image pickup means into an electrical output composed of successive signals corresponding to the intensities of light successively encountered by said scanning means in a line scanning direction, filter means interposed optically between an object to be televised and said image pickup means, index signal generating means disposed on said filter means, a lens screen comprising a plurality of spaced, cylindrical lenses interposed between said filter means and said image pickup means, and means for extracting high resolution color video signals from the output of said image pickup means and including means for deriving chrominance signals having the same color subcarrier frequency.

INVENTOR.
TOSHIRO WATANABE
BY
Lewis H. Eslinger
ATTORNEY

INVENTOR.
TOSHIRO WATANABE
BY
Lewis H. Eslinger
ATTORNEY

INVENTOR.
TOSHIRO WATANABE
BY
Lewis H. Eslinger
ATTORNEY

COLOR TELEVISION CAMERA SYSTEM WITH MEANS FOR GENERATING AN INDEXING SIGNAL HIGHER IN FREQUENCY THAN THE VIDEO INFORMATION

This invention relates to a color video signal generating apparatus which produces high resolution, sequential color video signals corresponding to the color components of an object to be televised.

In similar apparatus of the prior art, difficulties in the nature of poor color picture white balance, interference stripes caused by index signal display, separation of the color signals from the chrominance signals, apparatus complexity required to insure proper insertion of the index signal or the standard signal, are often encountered to result in overall picture quality degradation and/or unduly complex systems.

Accordingly, it is an object of this invention to provide a color video signal generating apparatus wherein the color images corresponding to the primary colors or other color components are converted into chrominance signals having the same color subcarrier frequency, whereby each of the color video signals will be uniformly distorted by transmission circuit means to provide color pictures with good white balance.

A further object of this invention is the provision of a color video signal generating apparatus wherein an index or marker signal is formed at a frequency which does not fall within the luminance signal band whereby the effective band width of the luminance signals may be widened to reproduce high resolution color pictures without interference of stripes caused by the index or marker signal.

Another object of this invention is the provision of color video signal generating apparatus wherein the inclusion of an index signal of accurate frequency in the video signals obtained from the apparatus functions to facilitate the subsequent separation of the color signals from the chrominance signal.

Another object of this invention is the provision of color video signal generating apparatus including cylindrical lens means which facilitate the insertion of the index or marker signal into the video signal to thereby provide for simplification of the apparatus.

As disclosed herein, the color video signal generating apparatus of the invention comprise image pickup means having scanning means and being operative to photoelectrically convert light projected onto said image pickup means into an electrical output composed of successive signals corresponding to the intensities of light successively encountered by said scanning means in a line scanning direction. Filter means are interposed optically between an object to be televised and said image pickup means, and said filter means comprise several regions respectively selecting light of different wave length ranges, and index signal generating means disposed on said regions. A lens screen is interposed between said filter means and said image pickup means and comprises spaced, cylindrical lenses which cooperate with said filter means to divide an image of the object into respective color components for projection onto said image pickup means. Means for extracting high resolution color video signals from the output of said image pickup means are provided, and include means for deriving chrominance signals having the same color subcarrier frequency, a luminance signal band, an index signal at a frequency which does not fall within said luminance signal band, and a standard signal.

The above and other objects and advantages of this invention are believed made clear by the following detailed description thereof taken in conjunction with the accompanying drawings wherein.

Figure 1:
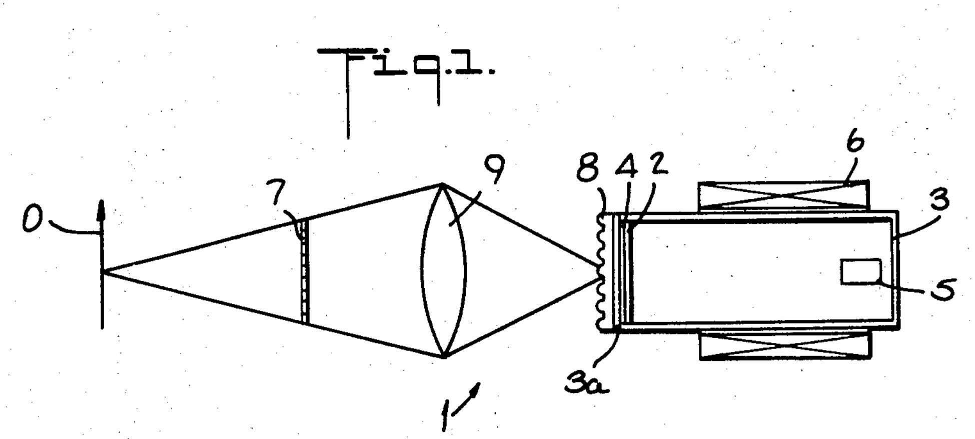
FIG. 1 is a schematic top view illustrating a color video signal generating apparatus constructed in accordance with the principles of a plurality of my copending applications for U.S. patent as identified hereinbelow.

Referring now to FIG. 1 of the drawings, apparatus for generating color video signals constructed in accordance with the principles of my copending applications for U.S. Pat., Ser. No. 657,139 filed Jul. 31, 1967, now U.S. Pat. 3,502,799, Ser. No. 646,045 filed Jun. 14, 1967 and 645,727 filed Jun. 13, 1967, respectively, and all assigned to the assignee hereof, are indicated generally at 1. Briefly described, for purposes of providing a clearer background for the description of this invention, the apparatus 1 comprise a single image pickup tube 3, in the nature, for example, of a vidicon tube, a color filter 7, a camera or objective lens 9, and a lens screen 8.

Figure 3:
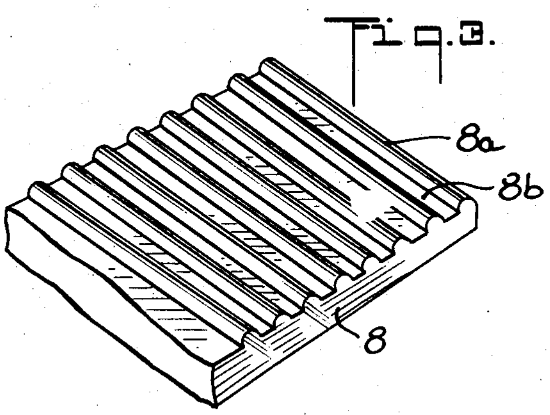
FIG. 3 is a perspective view schematically illustrating a lens screen employed in the apparatus of FIG. 1.

The image pickup tube 3 comprises the usual face plate 3*a* having a transparent conductive layer 4 or electrode formed on the inner face thereof. A photoelectric conversion layer 2 is in turn formed as shown on the transparent conductive layer 4, and the image pickup tube 3 further comprises an electron gun 5, and the usual electron beam deflection means as indicated at 6. A lens screen 8 is disposed on the outer surface of the face plate 3*a* and, as best seen in FIG. 3, consists of an assembly of cylindrical lenses 8*a* which are referred to as "lenticules" and are arranged at regular intervals with their longitudinal axes extending parallel to each other, and are spaced by flat portions 8*b* interposed therebetween, it being understood that the said flat portions 8*b* may, of course, be eliminated. The cylindrical portions 8*a* of the lens screen 8 are configured so that the respective focal points thereof will fall upon the photoelectric conversion layer 2.

Figure 2:
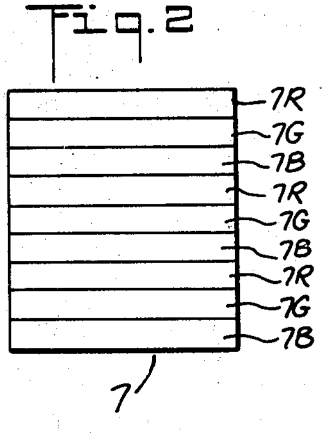
FIG. 2 is a schematic diagram illustrating the color filter employed in the apparatus of FIG. 1.

As best seen in FIG. 2, the color filter 7 comprises adjacent strips or filter elements as indicated at 7R, 7G, and 7B, respectively. The filter elements 7R are cyan filters which are effective for the absorption of red light, while the filter elements 7G are magneta filter elements which are effective for the absorption of green light, and the filter elements 7B are yellow filter elements which are effective for the absorption of blue light.

The objective lens 9 is effective to focus a real image of an objective, as indicated at O, on the photoelectric conversion layer 2. As such, the relationship between the objective lens 9, the cylindrical lens element 8*a*, and the color filter 7 should be in accordance with the following formula:

$$\frac{D'}{D}=\frac{F'}{F} \text{ wherein:}$$

F is the focal length of the objective lens 9;
F′ is the focal length of the respective cylindrical lenses 8*a;*
D is the width of the color filter element 7; and
D′ is the pitch of the cylindrical lenses 8*a*.

Figure 4:
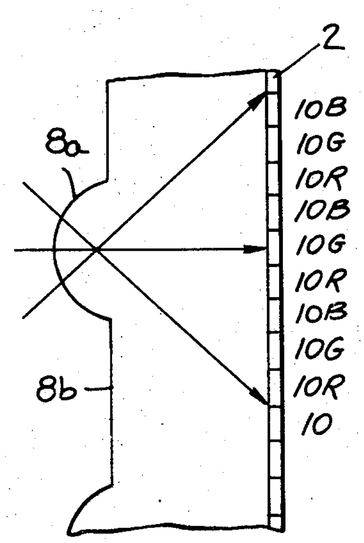
FIG. 4 is a schematic diagram illustrating the manner in which color separation is effected by the lens screen of FIG. 3 and the color filter of FIG. 2.

With this construction, it may be understood that images 10R, 10B and 10G of the respective color filter elements 7R, 7B and 7G will be separately focused on the photoelectric conversion layer 2 by each of the cylindrical lenses 8*a*. More specifically, and as best seen in FIG. 4 for one of the said cylindrical lenses, a set of images 10R, 10G and 10B, respectively, of the color filter 7 will be repeated three times for the cylindrical lens 8a. Accordingly, when the photoconductive layer 2, on which the color images thus resolved have been formed, is scanned by the electron beam in such manner that the line scanning direction is at right angles with the longitudinal axes of the cylindrical lenses 8a, the color video signal is produced in the electrode or layer 4. If a lens frequency $F_1$, which is a multiple of the number of cylindrical lenses 8a and the horizontal sweep frequency, is selected at 1.5 MHz, chrominance signals will result having a color subcarrier frequency of 3 × 1.5 MHz., or 4.5 MHz. More detailed description of the construction and manner of operation of the apparatus 1 may be readily obtained by reference to the copending applications referred to hereinabove.

Figure 6:
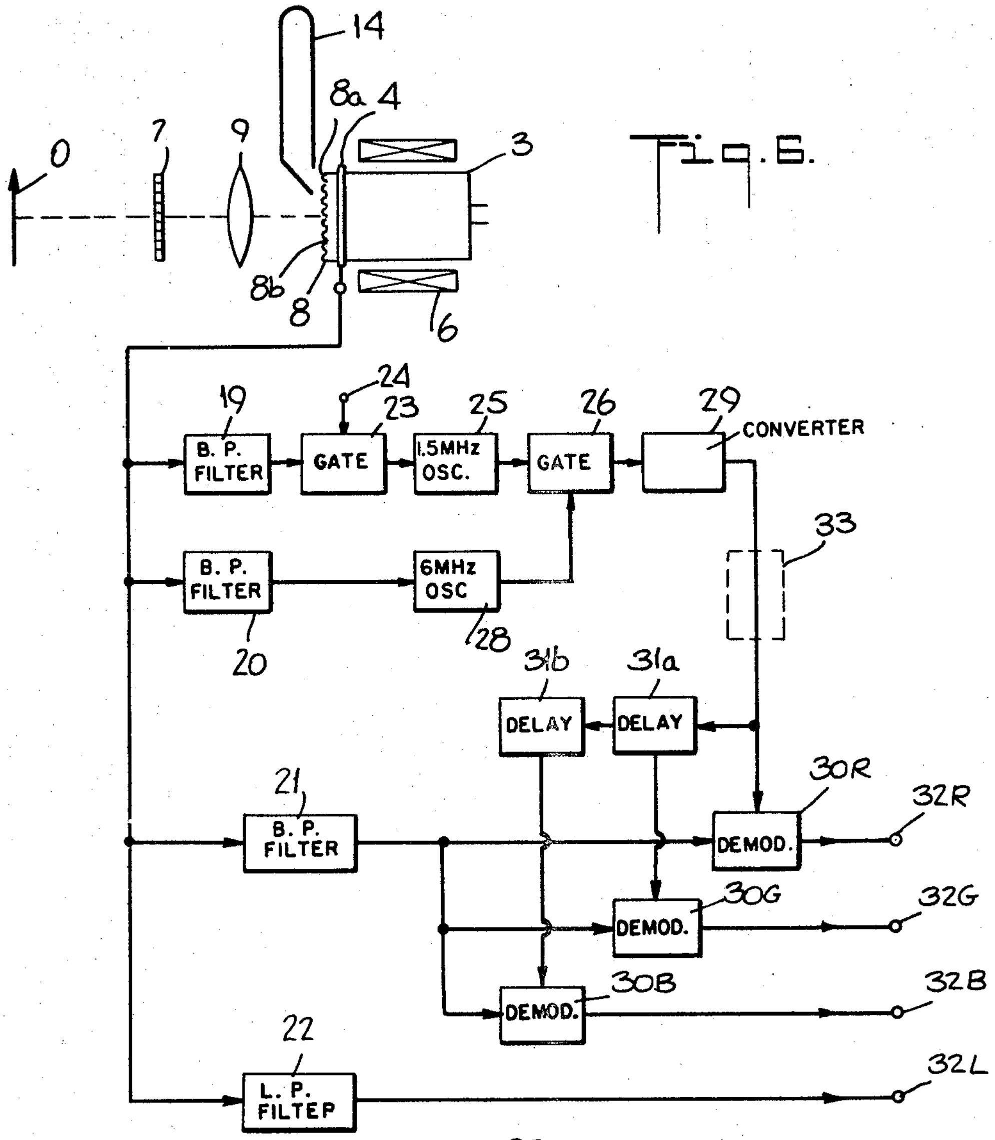
FIG. 6 is a schematic top view of color video signal generating apparatus constructed in accordance with the principles of this invention.
Figure 7:
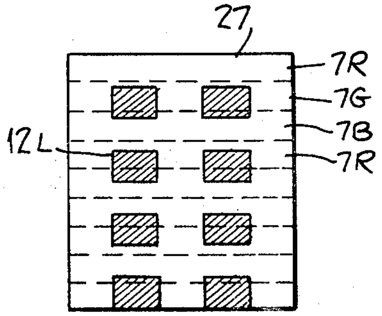
FIG. 7 is a schematic diagram illustrating the color filter employed in the apparatus of FIG. 6.

Referring now to the embodiment of this invention depicted in FIGS. 6 through 10, the same may be seen to include a color filter 27 which, as best seen in FIG. 7, has the same color filter element pattern as the color filter 7 of FIG. 2. In addition, the color filter 27 includes index signal generating means which are constituted by spaced, light sources 12L disposed thereon as shown and it may be understood that the said light sources are constituted by electroluminescent elements. Three sets of filter elements, each of which comprises a cyan filter element 7R, a magneta filter 7G, and a yellow filter element 7B, are provided in the filter 27, as are four rows of light sources 12L. Each row of the light sources 12L is separated into two parts since the said light source may interfere with the passage of light through the color filter 27.

Figure 9:
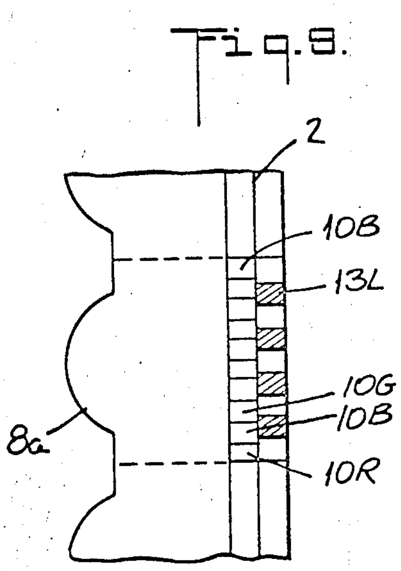
FIG. 9 is a schematic diagram illustrating the manner in which color separation is effected by the respective lens screen and color filter of the apparatus of FIG. 6.

As seen in FIG. 6, the color filter 27 is again disposed between the object 0 and the objective lens 9, whereby the image of the respective, separated light sources 12L will be prolonged by the cylindrical lenses 8a into a line to therefore insure that the separation of the said light sources does not deteriorate the index signal. With this construction of the color filter 27, it may be understood that, as best seen in FIG. 9, images 13L of the respective light sources 12L will be formed on the photoelectric conversion layer 2 simultaneously with the formation thereon of the color filter element images 10R, 10G and 10B, as discussed hereinabove.

Figure 5:
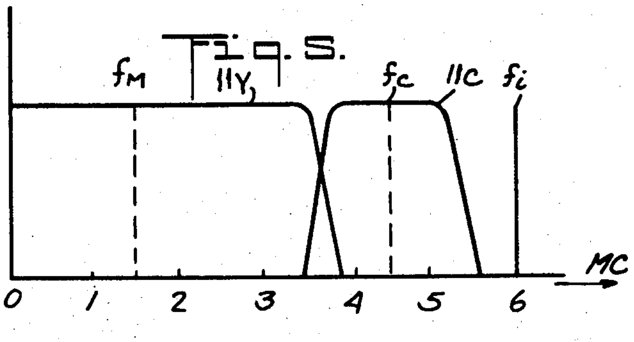
FIG. 5 is a diagram showing the frequency spectrums of the color video signals produced by the apparatus of this invention.

Operation of the electron beam scanning means 6 as seen in FIG. 6 will result in the provision of a chrominance signal, as discussed hereinabove, with a color subcarrier frequency $F_c$ of 4.5 MHz., and an index signal of 6 MHz. being obtained from the image pickup tube 3, and it may be understood that the index signal frequency is constituted by a multiple of the 1.5 MHz. lens frequency and a repeating time of 4. The frequency ranges of the respective luminance signal, the chrominance signal with color subcarrier frequency $f_c$ and index signal, are believed made clear by the frequency graph of FIG. 5 wherein 11Y represents the luminance signal, 11C represents the chrominance signal with a color subcarrier frequency $f_c$, and $f_i$ represents the frequency of the index signal and $f_m$ represents the standard frequency.

Figure 8:
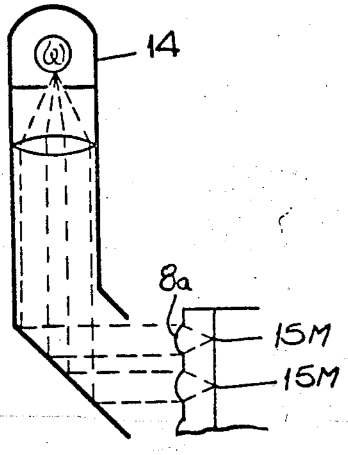
FIG. 8 is a schematic view of the standard frequency signal source employed in the apparatus of FIG. 6.

Referring again to FIG. 6 and 8, a standard frequency signal source is provided from a source of parallel light beams 14 to the noneffective areas 8b of the lens screen 8 is indicated at 14. As seen in FIG. 8, the parallel light beams provided from the standard frequency signal source 14 are focused on a side portion of the photoelectric conversion layer 2 by the lens screen 8 to form the standard line of the light beam as indicated at 15M. Although the frequency of the standard signal may be selected at random, it is preferable to select the same in accordance with the lens frequency of 1.5 MHz. Further, it is preferable to form the standard signal line 15M precisely at the corresponding position of one of the color images to provide for ease of synchronous demodulation. The control of the position of the standard signal line 15M may best be effected through control of the angle of incidence of the parallel light beam from the standard frequency signal source 14.

Since the parallel light beams are limitatively applied to the side areas of the lens screen 8, a standard frequency signal 16M (FIG. 10) formed thereby is inserted into the video signal during the beginning and end portion of every period of the horizontal sweep signals. Thus, the standard frequency signal 16M (FIG. 10) will not be visible in the displayed picture, it being understood that if the converse is true, that is to say, if the standard frequency signal is included in the effective portion of the video signal, a vertical line will be seen in the displayed picture to thus result in obvious deterioration of the latter.

The color subcarrier frequency $f_c$ and the index signal frequency $f_i$ are best selected in integral ratio of 3:4, wherein $f_c$ equals 4.5 MHz., and $f_i$ equals 6 MHz.

The standard frequency $f_m$ is preferably selected as a common multiple of the index signal frequency $f_i$ in a ratio of 1:4, wherein $f_m$ equals 1.5 MHz. and $f_i$ equals 6 MHz. With such selection, the color subcarrier signal for synchronous demodulation use may be readily formed from both the index signal $f_i$ and the standard frequency signal $f_m$.

With the modulation circuit construction as depicted in FIG. 6, the color video signal obtained from the transparent conductive layer or electrode 4 of the image pickup tube 3 is fed as indicated to a band-pass filter 19 which is effective to derive the standard frequency signal of 1.5 MHz. from the said color video signal. Therefrom, the signal is supplied to a first gate circuit 23 which is driven by the horizontal blanking signals as applied thereto from the terminal 24 to thus derive the standard signal 16M (FIG. 10), and the latter is supplied to an oscillator 25 of 1.5 MHz. to synchronize the latter at the standard signal frequency Fm. In addition, the color video signal obtained from the image pickup tube 3 is also fed as indicated to a band-pass filter 20 which is effective to derive the index signal at frequency $f_i$ of 6 MHz., and therefrom to an oscillator 28 of 6 MHz. which is synchronized by the said index signal frequency $f_i$. The resultant standard signal at frequency $f_m$, and the index signal at frequency $f_i$, are supplied as indicated from the respective gate circuit 26 and oscillator 28 to a gate circuit 26 which is effective to pass pulses of 6 MHz. in synchronism with the standard signal from the oscillator 25. These pulses are supplied to a frequency converter 29 for providing the color subcarrier signal at a frequency $f_c$ of 4.5 MHz.

The color subcarrier signal is fed to series connected delay circuit 31A and 31B to result in the provision of three signals which are shifted in phase from each other by 120 degrees. These three signals are supplied to synchronous demodulator circuits, as indicated at 30R, 30G and 30B, respectively, to provide the three color differential signals Y–R, Y–G, and Y–B from the respective terminals 32R, 32G and 32B.

The color video signal is also supplied to a band-pass filter 21 of 4.5 ± 0.5 MHz. for deriving the chrominance signal which is supplied therefrom as shown to each of the synchronous demodulator circuits 30R, 30G and 30B, and the said color video signal is also supplied as indicated to a low pass filter 22 for deriving the luminance signal with a frequency range of 0 to 4 MHz. and supplying the latter to a terminal 32L.

Figure 10:
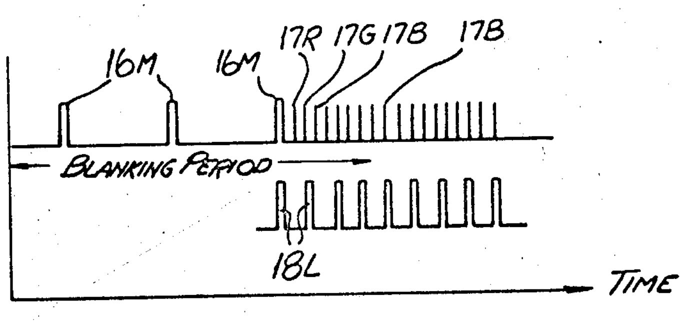
FIG. 10 is a diagram illustrating the relationship in point of time between the chrominance signal, the standard signal and the index signal.

The relationships in point of time between the chrominance signal, the standard signal and the index signal are believed made clear by the diagram of FIG. 10.

In the absence of a standard signal, it is possible to derive the color signals from the chrominance signal with the synchronous detection circuit being phase synchronized with the color subcarrier frequency signal of 4.5 MHz. which is formed by the index signal of 6 MHz. In such instance, however, a phase of the color subcarrier signal may not be in accordance with that of the specific color signal, whereby it would become necessary to accomplish a phase shift with regard to the color subcarrier signal. To this effect, variable delay circuit means as indicated in dashed lines at 33 in the circuit of FIG. 6 may be interposed between the frequency converter 29 and the respective synchronous demodulator circuits 30R, 30G and 30B, and the former adjusted, through observation of the color error in the displayed color picture, to provide for phase coincidence between the color subcarrier signal and the specific color signal.

It will be apparent that many modifications and variations in addition to those noted above may be effected in the described embodiment without departing from the spirit and scope of this invention as defined in the appended claims.

I claim:

1. A color video signal generating apparatus comprising image pickup means having scanning means and being operative to photoelectrically convert light projected onto said image pickup means into an electrical output composed of successive signals corresponding to the intensities of light successively encountered by said scanning means in a line scanning direction, filter means interposed optically between an object to be televised and said image pickup means and having several regions respectively selecting light of different wavelength ranges, a screen interposed between said filter means and said image pickup means and coacting with said filter means to divide an image of the object into respective color components which are projected onto said image pickup means to produce in said output respective chrominance signals having the same predetermined color subcarrier frequency, index image forming means on said filter means, said index forming means including a repeating sequence of integral area extending in a direction to said line scanning direction and coacting with said screen to project onto said image pickup means index images superimposed on said color components and which, when encountered in said line scanning direction, produce in said output an index signal at a frequency substantially greater than said color subcarrier frequency, and means employing said index signals to identify the respective color components of said chrominance signals and being operative to separate the respective color components of the color video signals from said output of the image pickup means.

2. A color video signal generating apparatus as in claim 1, in which said index image forming means consists of broken rows on said filter means partly overlapping said light selecting regions.

3. A color video signal generating apparatus as in claim 2, in which said light selecting regions of said filter means have the form of stripes of equal width extending in directions at right angles to said line scanning direction and being arranged side-by-side in said line scanning direction, said regions to select light of one wavelength range occur in said filter means with the same frequency as said regions to select light of a different wavelength range, and said broken rows occur on said filter means in said line scanning direction with a frequency greater than said frequency of occurrence of the regions for selecting light of each frequency range.

4. A color video signal generating apparatus as in claim 3, in which said broken rows are arranged on said filter means in spaced apart relation in rows parallel to said directions of the stripes constituting said light selecting regions, and the number of said rows is greater than the number of said regions for selecting light of each frequency range.

5. A color video signal generating apparatus as in claim 1, in which said means to extract color video signals from said output includes means to derive said index signal from said output, means to convert the derived index signal to a signal at said color subcarrier frequency, means to derive said chrominance signals from said output of the image pickup means, synchronous demodulator circuit means for each of the color video signals to be extracted receiving said chrominance signals derived from said output, and means to apply said signal at the color subcarrier frequency in phase shifted relation to each of said demodulator circuit means so as to obtain the respective color video signals from the latter.

6. A color video signal generating apparatus comprising filter means for passing light of different wave lengths; image pickup means for converting light into an electrical output; a screen interposed between said filter means and said image pickup means and coacting with said filter means to divide filtered light into respective color components, which are projected onto said image pickup means to produce in said output color signals having the same predetermined color sub frequency; means coacting with said screen for projecting onto said image pickup means at an area of the latter adjacent to an area on which the filtered light is projected, said images produce standard signals in said output when encountered in said line scanning direction during times adjacent to blanking periods, and in which said means to extract color video signals from said output further includes means images which produce standard signals in said output when encountered in said line scanning direction during the blanking periods, and in which said means to extract color video signals from said output further includes means to derive said standard signals from said output, and means employing said standard signals to synchronize said signal at the color subcarrier frequency.

7. A color video signal generating apparatus as in claim 6; in which said screen includes spaced separating lenses and non-separating portions disposed between said lenses and through which a luminance signal image is projected onto said image pickup means to produce a luminance signal in said output at a frequency determined by the number of said lenses and the scanning frequency of said image pickup means, and said means to produce said standard signals includes means to project parallel light rays at said lenses of said screen at a side portion of the latter.

8. A color video signal generating apparatus as in claim 6, in which said color subcarrier frequency and said frequency of the index signal are whole multiples of frequency of said standard signals.

9. A color video signal generating apparatus as in claim 8, in which said screen includes spaced separating lenses through which said color components and said index images are projected onto said image pickup means and portions between said lenses through which luminance images are projected onto said image pickup means to produce in said output luminance signals at the same frequency as said standard signals.

10. A color video signal generating apparatus as in claim 5, further including variable delay circuit means which is adjustable to synchronize said signal at the color subcarrier frequency with said derived chrominance signals.